(12) United States Patent
Lelievre et al.

(10) Patent No.: US 8,627,059 B2
(45) Date of Patent: Jan. 7, 2014

(54) METHOD FOR RECORDING AND DISTRIBUTING DIGITAL DATA AND RELATED DEVICE

(75) Inventors: Sylvain Lelievre, Montgermont (FR); Olivier Courtay, Rennes (FR); Stephane Onno, Saint Gregoire (FR)

(73) Assignee: Thomson Licensing (FR)

( * ) Notice: Subject to any disclaimer, the term of this patent is extended or adjusted under 35 U.S.C. 154(b) by 883 days.

(21) Appl. No.: 12/223,435

(22) PCT Filed: Jan. 31, 2007

(86) PCT No.: PCT/FR2007/000179
§ 371 (c)(1),
(2), (4) Date: Jul. 30, 2008

(87) PCT Pub. No.: WO2007/088273
PCT Pub. Date: Aug. 9, 2007

(65) Prior Publication Data
US 2009/0037733 A1 Feb. 5, 2009

(30) Foreign Application Priority Data
Jan. 31, 2006 (FR) ........................... 06 00880

(51) Int. Cl.
*G06F 7/22* (2006.01)
*G06F 3/023* (2006.01)

(52) U.S. Cl.
USPC ........................................... 713/151; 380/201

(58) Field of Classification Search
None
See application file for complete search history.

(56) References Cited

U.S. PATENT DOCUMENTS

| 594,987 A | 9/1999 | Traw et al. |
|---|---|---|
| 7,673,154 B2 * | 3/2010 | Sako et al. ............ 713/193 |
| 2002/0004903 A1 * | 1/2002 | Kamperman et al. ........ 713/182 |
| 2002/0184490 A1 | 12/2002 | McCown et al. |
| 2003/0072453 A1 | 4/2003 | Kelly et al. |
| 2003/0081777 A1 | 5/2003 | Brondijk et al. |
| 2003/0126445 A1 * | 7/2003 | Wehrenberg .................. 713/176 |
| 2004/0190868 A1 | 9/2004 | Nakano et al. |
| 2004/0233832 A1 | 11/2004 | Sako et al. |

(Continued)

FOREIGN PATENT DOCUMENTS

| EP | 1187390 | 3/2002 |
|---|---|---|
| JP | 2003223593 | 8/2003 |
| JP | 2004087063 | 3/2004 |
| JP | 2004280791 | 10/2004 |
| JP | 2005506651 | 3/2005 |
| WO | WO2005050907 | 6/2005 |

OTHER PUBLICATIONS

"Content Protection for Recordable Media Specification—Network Download Book", Aug. 5, 2005, Intel Corporation et al, XP002379489.

(Continued)

*Primary Examiner* — Venkat Perungavoor
(74) *Attorney, Agent, or Firm* — Tutunjian & Bitetto, P.C.

(57) ABSTRACT

The invention relates to a method for burning digital data onto a blank disk by a client device, the digital data being transmitted to the client device by a remote content server. The following steps are carried out by the client device for burning digital data onto a blank disk: establishing a secure authenticated channel with the content server; receiving the digital data transmitted by the content server; verifying the existence of the secure authenticated channel and authorizing the burning of the digital data received only during the existence of the secure authenticated channel; and burning onto the blank disk the digital data received.

8 Claims, 2 Drawing Sheets

(56) References Cited

U.S. PATENT DOCUMENTS

Figure 1:
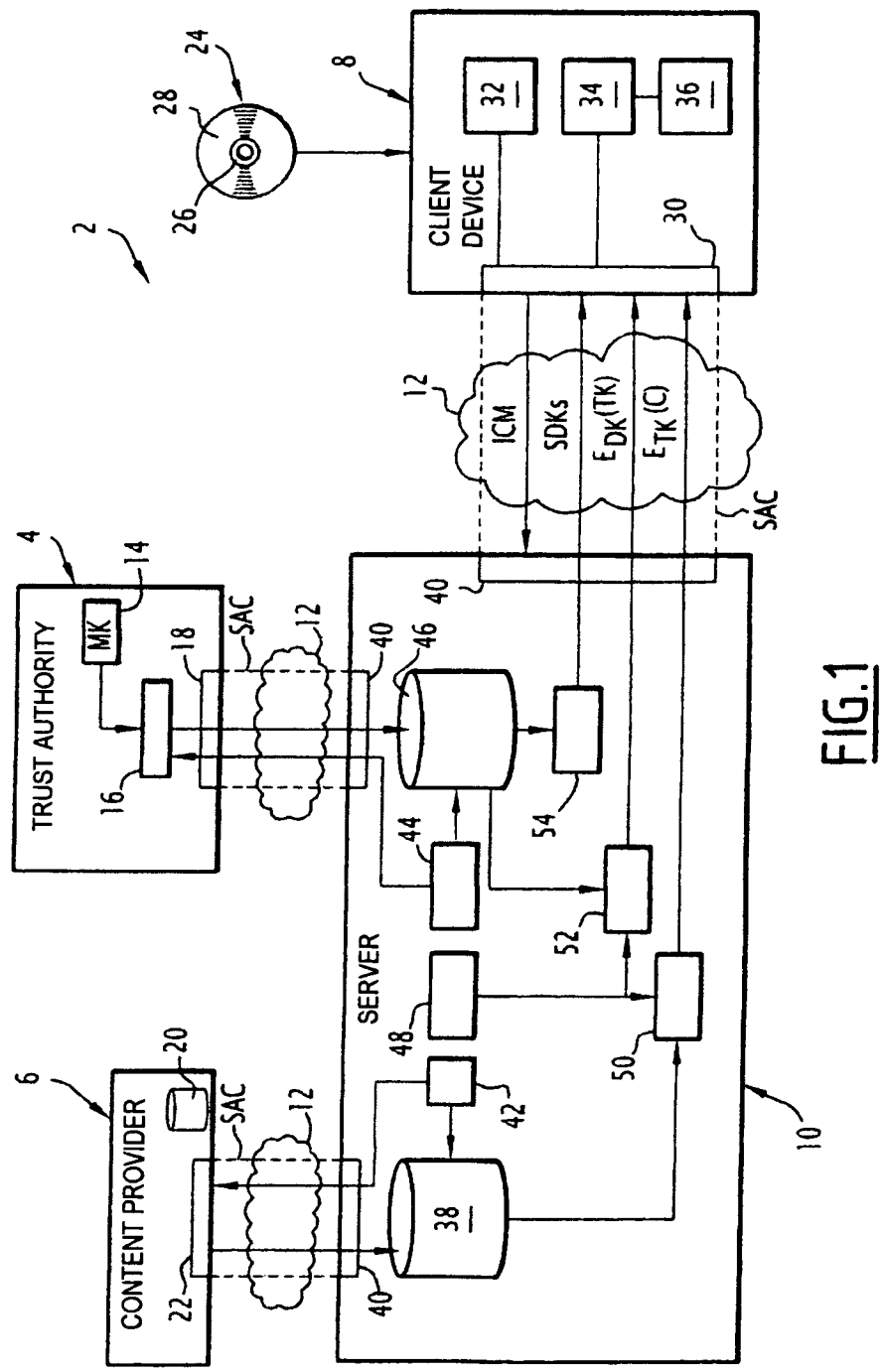

| | | |
|---|---|---|
| 2005/0038997 A1* | 2/2005 | Kojima et al. ............... 713/165 |
| 2005/0080877 A1* | 4/2005 | Sako et al. .................. 709/219 |
| 2005/0154682 A1 | 7/2005 | Taylor |
| 2006/0195405 A1* | 8/2006 | Miura et al. .................. 705/65 |
| 2008/0320304 A1* | 12/2008 | Fontijn ........................ 713/165 |

OTHER PUBLICATIONS

Search Report Dated Jul. 19, 2007.

* cited by examiner

METHOD FOR RECORDING AND DISTRIBUTING DIGITAL DATA AND RELATED DEVICE

This application claims the benefit, under 35 U.S.C. §365 of International Application PCT/FR07/000179, filed Jan. 31, 2007, which was published in accordance with PCT Article 21(2) on Aug. 9, 2007 in French and which claims the benefit of French patent application No.06000880, filed on Jan. 31, 2006.

The invention relates generally to a method for burning and a client device suitable for burning digital data onto a blank disk, the digital data being burned so as to be protected against illegal copies.

In particular, the invention relates to a method for burning digital data onto a disk having a blank lead-in area and a blank data zone by a client device, the digital data being transmitted to the client device by a remote content server via a distribution network, the client device comprising a network interface, means for establishing a secure authenticated channel with at least one content server, a burner and means for controlling the burner.

The invention also relates to a method for distributing digital data designed to be burned onto a blank disk.

A method for burning onto a disk a multimedia or software content is known particularly through document US 2005-0154682. The disk has a blank data zone and a lead-in area pre-recorded with disk keys. This method uses a burner capable of ordering from a remote server scrambled digital data and title keys used for scrambling the digital data. Finally, the burner is suitable for encrypting the title keys with the aid of the disk keys and for burning the scrambled digital data and the encrypted title keys onto the data zone of the disk.

However, this method of burning requires the preburning of the lead-in area of the disks with the disk keys so that a downloaded content can be burnt in a non-copyable manner in order to comply with the data protection systems such as CSS.

The object of the invention is to propose an alternative burning method providing better protection of the rights of the owners of the multimedia and software content.

Accordingly, the subject of the invention is a burning method of the aforementioned type, characterized in that it comprises the following steps carried out by the client device:
  setting up a secure authenticated channel with the content server;
  receiving at least a portion of the digital data transmitted by the content server over the secure authenticated channel, the said portion of the received digital data comprising a first encryption data item;
  verifying the existence of the secure authenticated channel with the content server and authorizing the burning onto the blank lead-in area of the disk of the first encryption data item received only during the existence of the secure authenticated channel; and
  burning the first encryption data item received onto the blank lead-in area of the disk.

According to particular embodiments, the burning method comprises one or more of the following features:
  the method also comprises the following steps:
    receiving the other portion of the digital data transmitted by the content server, the said other portion of the digital data comprising a scrambled content and a second encryption data item; and
    burning the scrambled content and the second encryption data item on the data zone of the disk;
  the method also comprises a step of ending the secure authenticated channel immediately after the step of burning the first encryption data item;
  the first encryption data item is a set comprising the results of encryptions of a first encryption key by a plurality of keys, the first encryption data item being necessary to descramble the content;
  the second encryption data item is one or more second encryption keys encrypted with the aid of the first encryption key, the or each second encryption key being necessary to descramble the content; and
  the first encryption key is a disk key and the or each second encryption key is a title key within the meaning of the CSS protocol.

A further subject of the invention is a method of distributing digital data via a remote content server to at least one client device via a distribution network, the remote content server comprising a network interface, at least one random number generator, a scrambling module, an encryption module, a module for establishing a secure authenticated channel, the client device comprising a network interface, a user interface, means for establishing a secure authenticated channel, a burner and means for controlling the burner, the digital data being designed to be burned by the client device onto a disk having a blank lead-in area and a blank data zone, characterized in that it comprises a step of ordering from the content server data representative of a content intended to be burned onto the disk by the client device, and the steps of the burning method mentioned above.

Finally a further subject of the invention is a client device suitable for burning digital data onto a disk having a blank lead-in area and a blank data zone, the digital data being transmitted to the client device by a remote content server via a distribution network, characterized in that it comprises:
  means for setting up a secure authenticated channel with the content server;
  a network interface for receiving at least a portion of the digital data transmitted by the content server over the secure authenticated channel, the said portion of the received digital data comprising a first encryption data item;
  command means for checking the existence of the secure authenticated channel and authorizing the burning onto the blank lead-in area of the disk of the first encryption data item received only during the existence of the secure authenticated channel; and
  a burner suitable for burning the first encryption data item received onto the blank lead-in area of the disk.

Figure 2:
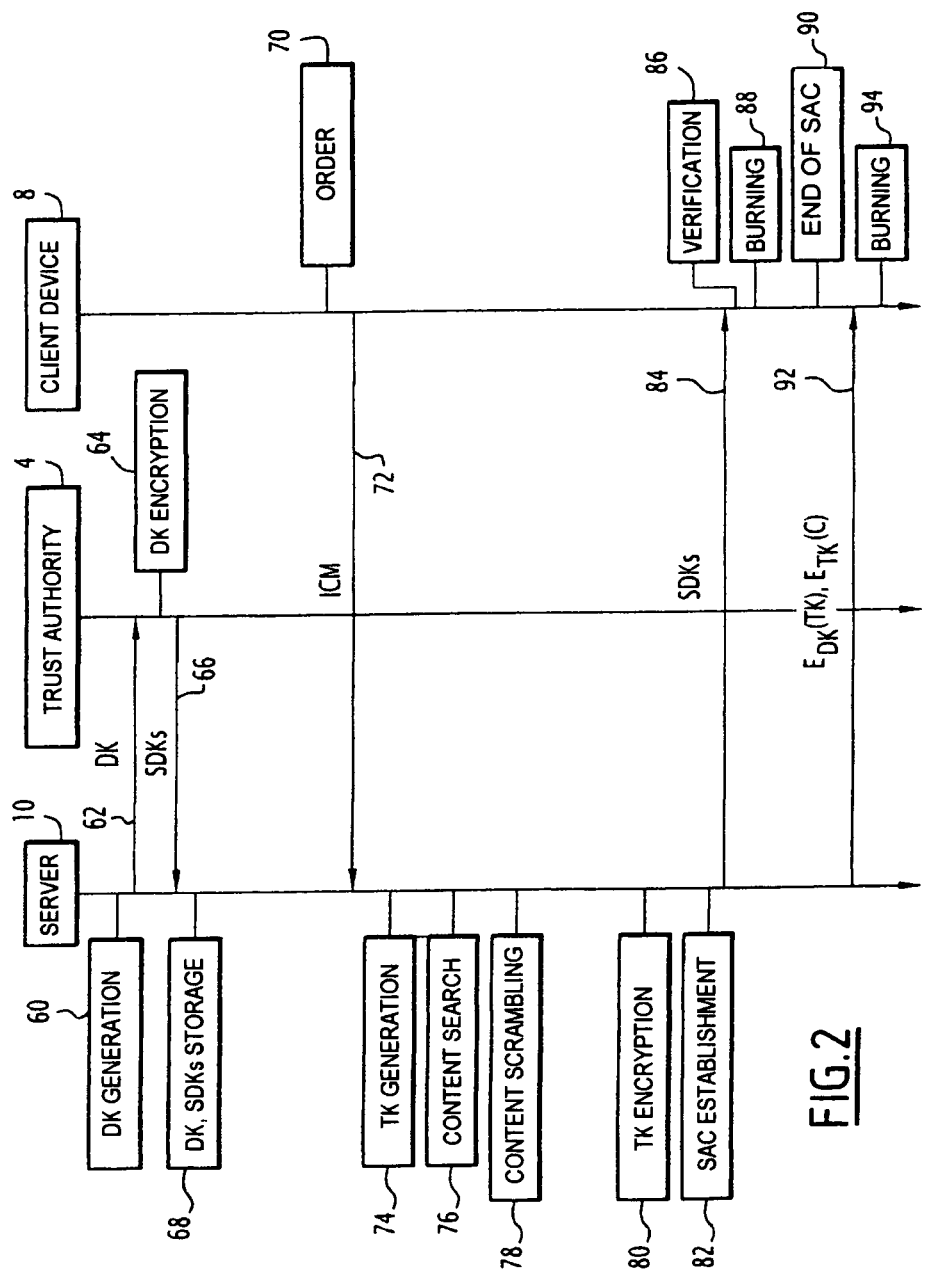

The invention will be better understood on reading the following description, given only as an example and made with reference to the drawings in which:
  FIG. 1 is a functional block diagram of the system allowing the application of the methods according to the invention; and
  FIG. 2 is a diagram illustrating the operations carried out by the equipment illustrated in FIG. 1.

The system 2 allowing the application of the methods according to the invention is illustrated schematically in FIG. 1.

This system 2 comprises a trust authority 4, a content provider 6 and a client device 8, each suitable for interchanging data with a remote content server 10 via a distribution network 12, such as for example the Internet network.

In a conventional manner, the trust authority 4 comprises a secure memory 14 storing a set of master keys MK, an encryption module 16 connected to the memory 14 and a network interface 18.

The encryption module 16 is suitable for encrypting a disk key DK via a set of master keys MK stored in the memory 14 in order to produce a set of secure disk keys $SDK_S$.

Each set of secure disk keys $SDK_S$ is produced based on and is associated with a particular disk key DK transmitted by the content server 10, as explained below.

The network interface 18 is suitable for receiving disk keys DK from the content server 10 and for transmitting thereto sets of secure disk keys $SDK_S$ via the network 12, for example via a secure authenticated channel SAC.

The content provider 6 comprises a database 20 storing digital data and a network interface 22 allowing the transmission of the digital data to the content server 10 via the network 12, for example via a secure authenticated channel SAC.

The digital data are representative of multimedia or software content. They are for example sequences of audio, video, text data or computer data files used for the application of software. These data are protected by copyright and may therefore not be copied or reproduced after burning.

Preferably, the digital data are stored in the base 20 in compressed form.

The client device 8 is usually placed with a user who desires to download and burn onto a blank disk 24 digital data representing multimedia or software content.

The blank disk 24 is a DVD disk comprising a lead-in area 26 that can be read and not written by a conventional burner and a data zone 28 that can be read and written by a conventional burner.

The client device 8 is for example constituted by a computer connected to a burner of a particular type.

It comprises a network interface 30 connected to a user interface 32 of the keyboard and/or screen and/or remote control type in order to order digital data from the content server 10.

The client device 8 also comprises a central processor unit 34 connected on the one hand to the network interface 30 and on the other hand to a digital data burning module 36.

The central processor unit 34 is suitable for establishing a secure authenticated channel SAC with the content server 10, via the distribution network 12.

For this purpose, when each SAC channel is established, the central processor unit 34 is suitable for computing a session key KS based on cryptographic data interchanged with the content server 10. This session key KS will be used to protect the data interchanged with the server 10.

The protocol for establishing the secure authenticated channel SAC is for example a standard protocol such as the SSL (Secure Sockets Layer) protocol or a proprietary protocol such as the protocol described in the specifications of the protection system with the registered trademark "Smart Right", this protocol also being described in U.S. patent application Ser. No. 10/978,162 filed on 29 Oct. 2004.

The establishment of the secure authenticated channel SAC on the one hand allows the client device 8 to ensure that it is exchanging data with a recognized and legal content server 10 and on the other hand allows the content server 10 to ensure that the client device 8 is a recognized and legal device and provides a high level of protection of the digital data during the operation for burning the latter onto the blank disk.

In parallel, the SAC channel protects the interchanged data against any interception and decoding by a pirate device.

The central processor unit 34 is capable of controlling the burning module 36 in order to authorize or prohibit the burning of digital data onto the blank disk 24 depending on whether the establishment of a secure authenticated channel SAC exists or is absent.

According to the embodiment described, the data may be burned onto the lead-in area 26 of the blank disk only after the establishment of the secure authenticated channel SAC and while the latter is validly established.

According to this embodiment, the burning of data onto the data zone 28 of the blank disk 24 is authorized even when there is no establishment of the secure authenticated channel.

The burning module 36 is suitable for burning data both onto the lead-in area 26 and onto the data zone 28 of the blank disk 24.

The content server 10 comprises a content base 38, a network interface 40 and a processor 42 in order to supply the client device 8 with the digital data ordered by the latter.

The content base 38 is capable of storing digital data representative of multimedia or software content.

The processor 42 is capable of fetching digital data from the content base 38 based on an identification ICM of the latter, as explained below.

When the content base 38 does not contain the digital data requested, the processor 42 transmits a request for these data to the content provider 6 which sends the requested data via the distribution network 12, for example via a secure authenticated channel SAC, so that these data are stored in the content base 38.

In the example described, the content server 10 is capable of scrambling the digital data according to the DVB CSS ("Digital Video Broadcasting Content Scrambling System") standard.

In order to scramble the digital data according to this standard, the content server 10 also comprises a first generator 44 connected to an encryption database 46 and to the network interface 40.

The first generator 44 is capable of producing random numbers suitable for constituting disk keys DK and transmitting them on the one hand to the trust authority 4 via the interface 40 and the network 12 and, on the other hand, to the encryption database 46.

The encryption database 46 comprises a mapping table suitable for storing disk keys DK and sets of secure disk keys $SDK_S$ each corresponding to a disk key DK and obtained by the encryption of the latter by the trust authority 4.

The content server 10 also comprises a second generator 48 connected to a scrambling module 50 and an encryption module 52.

The second generator 48 is capable of generating random numbers suitable for constituting title keys TK.

The scrambling module 50 is connected to the content base 38 and to the network interface 40 in order to scramble the digital data originating from the base 38 with the aid of the title keys TK originating from the generator 48 and in order to transmit the scrambled digital data $E_{TK}(C)$ to the client device 8.

The encryption module 52 is connected to the encryption database 46 and to the network interface 40. It is capable of encrypting the title keys TK with the aid of a disk key DK and of transmitting the title keys thus encrypted $E_{DK}(TK)$ to the client device 8.

The content server 10 also comprises a control module 54 suitable for establishing or deleting the secure authenticated channel SAC with the client device 8.

The control module 54 is capable of constructing, during the establishment of each secure authenticated channel SAC, a new session key KS with the aid of cryptographic data interchanged with the client device 8.

This session key KS is used by the control model 54 to protect the data interchanged with the client device 8. This session key KS is identical to the session key computed by the device 8.

The control module 54 is also suitable for fetching from the encryption database 46 all the secure disk keys $SDK_S$ associated with the disk key DK having been used to encrypt the title keys TK and for sending them to the client device when the secure authenticated channel SAC has been established.

The steps of the methods according to the invention are illustrated in FIG. 2 by three time axes t and by the arrows illustrating the interchanges between the content server 10, the trust authority 4 and the client device 8 and the processing steps carried out by these equipment items.

The steps 60 to 68 described below are carried out prior to any ordering of a multimedia or software content by a user.

During an initial step 60, the first random number generator 44 of the content server 10 generates disk keys DK.

In step 62, the generated disk keys DK are transmitted to the encryption module 16 of the trust authority via the network 12, for example via a secure authenticated channel SAC.

In parallel, the same disk keys DK generated by the first generator 44 are transmitted to the encryption database 46.

In step 64, the encryption module 16 encrypts the received disk keys DK with the aid of the master keys MK stored in the memory 14 in order to produce the sets of secure disk keys $SDK_S$.

During a step 66, the sets of secure disk keys $SDK_S$ are transmitted from the encryption module 16 to the encryption database 46 of the content server.

During a step 68, the sets of secure disk keys $SDK_S$ are stored in the encryption database 46 in a mapping table so that each given set of secure disk keys $SDK_S$ is associated with the disk key DK having been used to produce the set of secure disk keys $SDK_S$.

During a step 70, the user desiring to buy a multimedia or software content to be burned onto a blank disk 24 connects with the aid of the user interface 32 of the client device to the content server 10 and searches for the multimedia or software content of his choice.

When the user has found a content that he desires to buy, for example a video content, he produces an order containing the identification ICM of this video content.

During a step 72, the order produced by the client is transmitted from the client device 8 to the content server 10 via the network 12.

During the next step 74, the second generator 48 of the content server 10 produces title keys TK that will be used to scramble the video content ordered by the user.

During a step 76, the processor 42 searches in the content base 38 for the ordered video content with the aid of the identification ICM.

In step 78, the scrambling module 50 retrieves the video content that has been found (76) in the content base (38) and scrambles it with the aid of the title keys TK produced (74) by the second generator 48.

During a step 80, the encryption module 52 encrypts the title keys TK with the aid of a specific disk key DK originating from the encryption database 46.

During the step 82, the control module 54 authenticates the client device 8. The central processor unit 34 of the client device authenticates the content server 10 so as to establish a secure authenticated channel SAC between the client device 8 and the content server 10. During this step, the central processor unit 34 of the client device and the control module 54 of the content server each in parallel compute a session key KS. This session key KS will be used by the module 54 to encrypt the data to be transmitted and thus send these data in a secure authenticated channel. This same session key will be used by the central processor unit 34 to decrypt the received data sent by the server 10.

During a step 84, the control module 54 of the content server searches in the encryption database 46 for all the secure disk keys $SDK_S$ corresponding to the disk key DK used to encrypt the title keys TK during the step 80.

Then, the control module 54 transmits all the secure disk keys $SDK_S$ to the client device 8.

During a step 86, the central processor unit 34 verifies whether the secure authenticated channel is properly established and if, and only if, this is the case, authorizes the burning on the data zone 28 of all the secure disk keys $SDK_S$ received by the client device 8.

During a step 88, the burning module 36 burns all the secure disk keys $SDK_S$ onto the lead-in area 26 of the blank disk 24. All the secure disk keys $SDK_S$ are burned gradually and during the receipt of the data by the central processor unit 34. During this burning, the central processor unit 34 continues to check whether the secure authenticated channel is properly established.

During a step 90, the central processor unit 34 of the client device ends the secure authenticated channel SAC.

During a step 92, the video content scrambled with the aid of the title keys $E_{TK}(C)$ and the title keys encrypted by the disk key $E_{DK}(TK)$ are transmitted from the content server 10 to the client device 8.

During a step 94, the central processor unit 34 of the client device authorizes the burning module 36 to burn data onto the data zone 28 of the disk. The scrambled video content $E_{TK}(C)$ and the encrypted title keys $E_{DK}(TK)$ are burned onto the data zone by the burning module 36. It will be noted that, even in the absence of the secure authenticated channel SAC between the content server 10 and the client device 8, it is possible to burn the scrambled content and the encrypted title keys into the data zone of the disk.

On the other hand, when the secure authenticated channel is no longer established, the central processor unit 34 of the client device 8 then prohibits the burning module 36 from burning any data onto the lead-in area 26 of the disk.

As a variant, the client device 8 is a burner comprising a man-machine interface and a central processor unit.

As a variant, the client device comprises a first burning module connected to the central processor unit and capable of burning data only into the lead-in area and during the existence of a secure authenticated channel SAC and a second burning module also connected to the central processor unit is capable of burning data into the data zone even in the absence of the secure authenticated channel SAC. In this case, the central processor unit is suitable for transmitting the digital data to the first or the second burning module depending on the type of data that it receives.

As a variant, the DVD disk is of the DVD-R, DVD-RW, DVD+R, DVD+RW or DVD-RAM type.

In the description above, the protection system CSS (Content Scrambling System) is used to protect the digital data burned onto the blank disk. As a variant, other data storage media and other protection systems may also be used, such as for example the system of Content Protection for Prerecorded Media (CPPM), the system of Content Protection for Recordable Media (CPRM), the Blue-ray Disk Copy Protection System (BD-CPS), the Advanced Access Content System (AACS) for high definition disks HD DVD and the "Vidi" system for a disk of the DVD+R+RW type.

Preferably, such a burning method is more secure.

The invention claimed is:

1. Method of burning digital data onto a disk having a blank lead-in area and a blank data zone via a client device, the digital data being transmitted to the client device by a remote content server via a distribution network, wherein the following steps are carried out by the client device:
   establishing a secure authenticated channel with the content server;
   receiving at least a portion of the digital data transmitted by the content server over the secure authenticated channel, the said portion of digital data received comprising a first encryption data item;
   continuously verifying the existence of the secure authenticated channel with the content server and authorizing the burning onto the blank lead-in area of the disk of the first encryption data item received only during the existence of the secure authenticated channel; and
   burning the first encryption data item received onto the blank lead-in area of the disk.

2. The burning method according to claim 1, further comprising the following steps:
   receiving the other portion of the digital data transmitted by the content server, the said other portion of the digital data comprising a scrambled content and a second encryption data item; and
   burning the scrambled content and the second encryption data item on the data zone of the disk.

3. The burning method according to claim 1, further comprising a step of ending the secure authenticated channel immediately after the step of burning the first encryption data item.

4. The burning method according to claim 1, wherein the first encryption data item is a set comprising the results of encryptions of a first encryption key by a plurality of keys, the first encryption data item being necessary to descramble the content.

5. The burning method according to claim 2, wherein the second encryption data item is one or more second encryption keys encrypted with the aid of the first encryption key, the or each second encryption key being necessary to descramble the content.

6. The burning method according to claim 2, wherein the first encryption key is a disk key and the or each second encryption key is a title key within the meaning of the CSS protocol.

7. The method of distributing digital data via a remote content server to at least one client device via a distribution network, the digital data being designed to be burned by the client device onto a disk having a blank starting zone and a blank data zone, wherein the method comprising a step of ordering from the content server data representative of a content intended to be burned onto the disk by the client device, and the steps of the burning method according to claim 1.

8. A client device suitable for burning digital data onto a disk having a blank starting zone and a blank data zone, the digital data being transmitted to the client device by a remote content server via a distribution network, the client device comprising:
   a central processor unit configured to establish a secure authenticated channel with the content server;
   a network interface for receiving at least a portion of the digital data, transmitted by the content server over the secure authenticated channel, the said portion of digital data received comprising a first encryption data item;
   the central processor unit being further configured to continuously check the existence of the secure authenticated channel and authorize the burning onto the blank starting zone of the disk of the first encryption data item received only during the existence of the secure authenticated channel; and
   a burner suitable for burning the first encryption data item received onto the blank starting zone of the disk.

* * * * *